United States Patent [19]
McDonnell

[11] Patent Number: 6,085,510
[45] Date of Patent: Jul. 11, 2000

[54] SICKEL GUARD AIR SYSTEM

[76] Inventor: Steve C. McDonnell, Box 163, Beardsley, Minn. 56211

[21] Appl. No.: 09/310,478

[22] Filed: May 12, 1999

[51] Int. Cl.$^7$ .................................................. A01D 57/10
[52] U.S. Cl. ................................. 56/298; 56/12.9; 56/158
[58] Field of Search ..................... 56/12.8, 12.9, 56/13.3, 13.4, 158, 293, 219, 296, 297, 298, 299, 300, 301, 303, 307, 308, 309, 310, DIG. 8

[56] References Cited

U.S. PATENT DOCUMENTS

| | | | |
|---|---|---|---|
| 2,737,006 | 3/1956 | Klingler | 56/158 |
| 4,406,112 | 9/1983 | Brooks | 56/12.9 |
| 4,783,951 | 11/1988 | Richards et al. | 56/12.9 |
| 4,866,919 | 9/1989 | Brooks | 56/296 X |
| 5,450,716 | 9/1995 | Gidge | 56/12.8 X |

*Primary Examiner*—Robert E. Pezzuto
*Attorney, Agent, or Firm*—Michael S. Neustel

[57] ABSTRACT

A sickel guard air system for assisting in moving grain about to be cut over a cutter assembly of a harvester thereby preventing grain waste and shatter. The inventive device includes a guard having a pair of extended members and retainer members, a passageway extending through each of the extended members, a nozzle fluidly connected to the passageway for dispersing pressurized air between the extended member and the retainer member. An air pressure system is fluidly connected to the passageways for providing a continuous flow of pressurized air. The pressurized air assists in the feeding of the crop being harvested and also forces shattered bean pods and beans into the header of the combine. In an alternative embodiment, a pair of nozzles are fluidly connected to the passageway and extend outwardly from the extended member in a V-shaped pattern.

7 Claims, 5 Drawing Sheets

SICKEL GUARD AIR SYSTEM

BACKGROUND OF THE INVENTION

1. Field of the Invention

The present invention relates generally to sickel guards and more specifically it relates to a sickel guard air system for assisting in moving grain about to be cut over a cutter assembly of a harvester thereby preventing grain waste and shatter.

When harvesting a crop, especially edible beans, the bean pod will shatter after the plant is severed by the cutter assembly. The dislodged beans then fall upon the front portion of the harvester and thereafter will fall into the sickel bar or roll completely off the harvester without being harvested. This can cost the farmer many bushels per acre which can be costly to the farmer in the long term. Hence, there is a need for a system that will reduce the amount of grain lost during harvest.

2. Description of the Prior Art

Harvester cutter assemblies have been in use for years. Typically, a conventional harvester cutter assembly will be comprised of a header having a sickel bar having a plurality of sickel blades reciprocating within a plurality of sickel guards. The sickel blades slide within the plurality of sickel guards for severing the crop. As the sickel blades sever the crop, the plant is violently jarred thereby causing the pods to "shell out" allowing the beans within the pods to be removed prior to fully entering the header of the combine. Over the long term, this can be extremely expensive for the farmer.

Examples of attempts to solve this problem include U.S. Pat. No. 2,737,006 to Klingler; U.S. Pat. No. 4,783,951 to Richards et al; U.S. Pat. No. 2,718,744 to Phillips; U.S. Pat. No. 4,866,919 to Brooks; U.S. Pat. No. 4,730,444 to Leffel et al; U.S. Pat. No. 3,760,573 to Porter; U.S. Pat. No. 3,165,874 to Osteen; U.S. Pat. No. 2,710,516 to Kaesemeyer et al; U.S. Pat. No. 2,670,586 to Phillips which are all illustrative of such prior art.

While these devices may be suitable for the particular purpose to which they address, they are not as suitable for assisting in moving grain about to be cut over a cutter assembly of a harvester thereby preventing grain waste and shatter. Previous attempts to utilize air pressure have failed because they emit the pressurized air far away from the cutting action.

In these respects, the sickel guard air system according to the present invention substantially departs from the conventional concepts and designs of the prior art, and in so doing provides an apparatus primarily developed for the purpose of assisting in moving grain about to be cut over a cutter assembly of a harvester thereby preventing grain waste and shatter.

SUMMARY OF THE INVENTION

In view of the foregoing disadvantages inherent in the known types of harvester cutter assemblies now present in the prior art, the present invention provides a new sickel guard air system construction wherein the same can be utilized for assisting in moving grain about to be cut over a cutter assembly of a harvester thereby preventing grain waste and shatter.

The general purpose of the present invention, which will be described subsequently in greater detail, is to provide a new sickel guard air system that has many of the advantages of the cutter assemblies mentioned heretofore and many novel features that result in a new sickel guard air system which is not anticipated, rendered obvious, suggested, or even implied by any of the prior art cutter assemblies, either alone or in any combination thereof.

To attain this, the present invention generally comprises a guard having a pair of extended members and retainer members, a passageway extending through each of the extended members, a nozzle fluidly connected to the passageway for dispersing pressurized air between the extended member and the retainer member. An air pressure system is fluidly connected to the passageways for providing a continuous flow of pressurized air. The pressurized air assists in the feeding of the crop being harvested and also forces shattered bean pods and beans into the header of the combine. In an alternative embodiment, a pair of nozzles are fluidly connected to the passageway and extend outwardly from the extended member in a V-shaped pattern.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a sickel guard air system that will overcome the shortcomings of the prior art devices.

Another object is to provide a sickel guard air system that increases crop yields.

An additional object is to provide a sickel guard air system that reduces the amount of seed that escapes the header of the combine.

A further object is to provide a sickel guard air system that assists in the feeding of the crop into the cutter assembly and into the header.

Another object is to provide a sickel guard air system that reduces bunching on the deck of the header.

A further object is to provide a sickel guard air system that delivers pressurized air near the cutter assembly.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
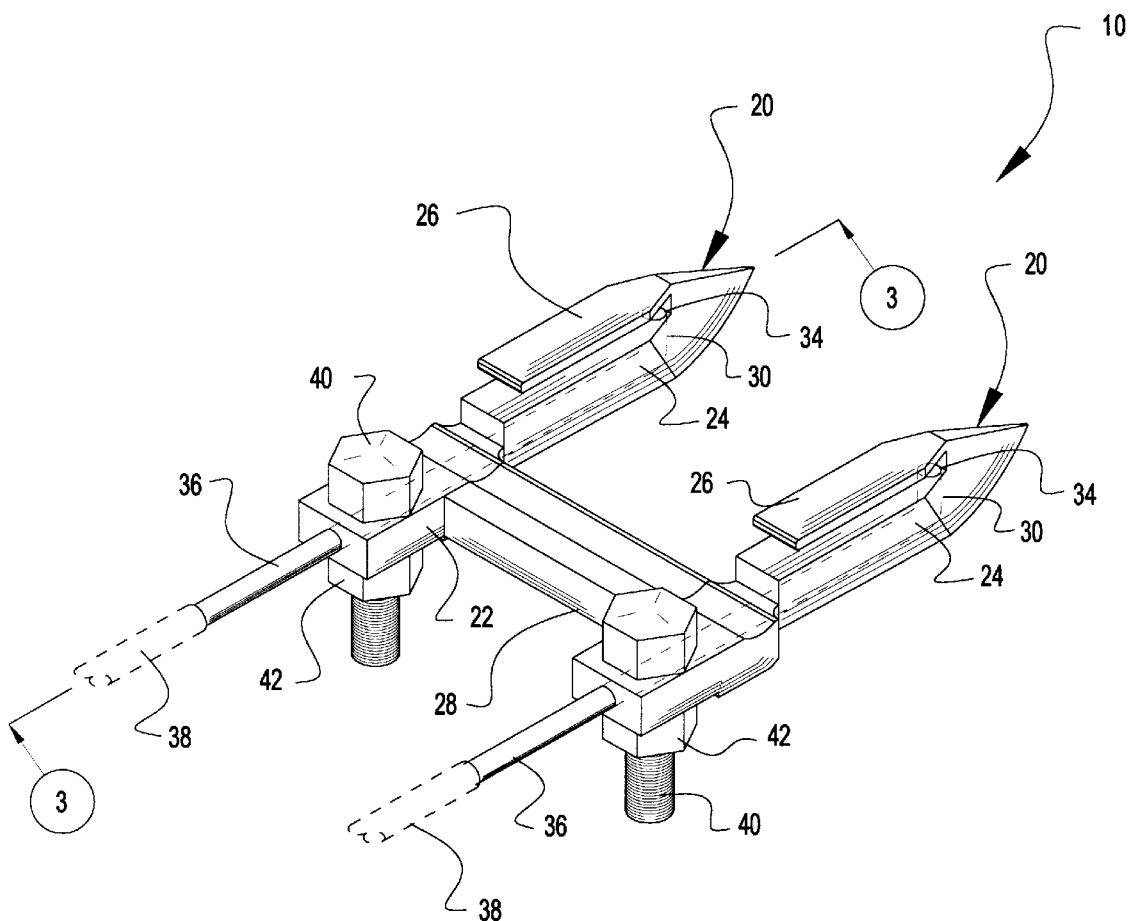
FIG. 1 is an upper perspective view of the present invention.

Turning now descriptively to the drawings, in which similar reference characters denote similar elements throughout the several view, FIGS. 1 through 5 illustrate a sickel guard air system 10, which comprises a guard 20 having a pair of extended members 24 and retainer members 26, a passageway 30 extending through each of the extended members 24, a nozzle 34 fluidly connected to the passageway 30 for dispersing pressurized air between the extended member and the retainer member. An air pressure system is fluidly connected to the passageways 30 for providing a continuous flow of pressurized air. The pressurized air assists in the feeding of the crop being harvested and also forces shattered bean pods and beans into the header of the combine. In an alternative embodiment, a pair of nozzles 60 are fluidly connected to the passageway 30 and extend outwardly from the extended member in a V-shaped pattern.

Figure 2:
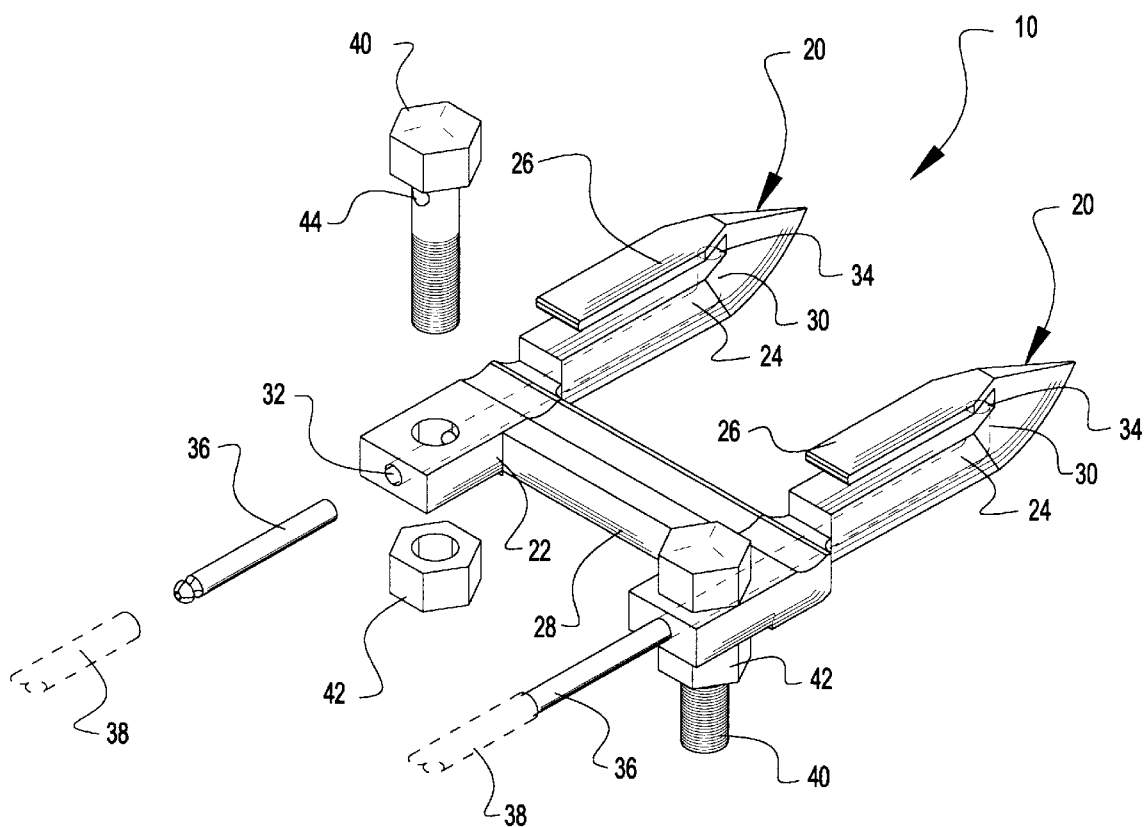
FIG. 2 is an exploded upper perspective view of the present invention.

As best shown in FIGS. 1 and 2 of the drawings, the guard 20 comprises a pair of bases 22, a cross member 28 secured between the bases 22, a pair of extended members 24 extending from the bases 22 and cross member 28, and a pair of retainer members 26 secured to the distal ends of the extended members 24 forming a space there between for receiving a sickel blade. Each base 22 includes an aperture for receiving a bolt 40 for securing to the header of a combine. The sickel blade passes through the space between the extended members 24 and the retainer members 26 thereby severing the crop being harvested thereby severing the stem of the plant. During the severing of the plant, the crop plant is severely jarred causing the bean pods to be removed and shatter. In use, a plurality of guards 20 would be utilized, however the remaining description will only describe the utilization of one guard 20.

Figure 3:
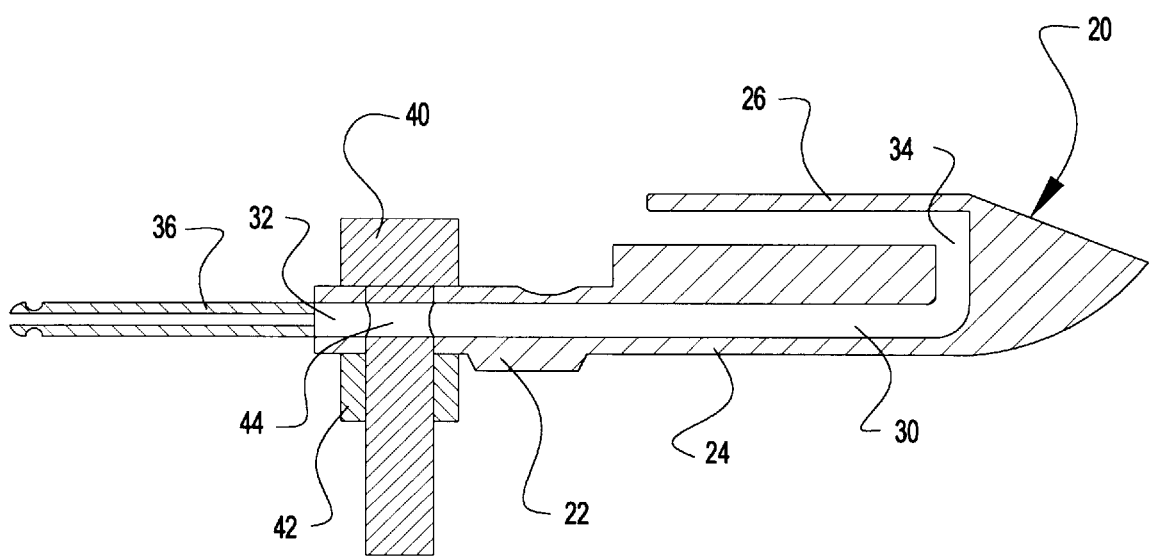
FIG. 3 is a cross sectional view taken along line 3—3 of FIG. 1 of the drawings.

As best shown in FIG. 3 of the drawings, an opening 32 extends into each base 22 fluidly connected to a passageway 30 within the base 22 and the extended member 24. A connector 36 is fluidly connectable to the opening 32 with the base wherein the connector 36 is fluidly connected to a pressurized air supply. The pressurized air supply may be comprised of any well-known air supply such as a fan drive by hydraulics, belts or electricity.

The passageway 30 extends through the base 22 through the extended member 24 as shown in FIG. 3 of the drawings. A nozzle 34 extends into the extended member and is fluidly connected to the passageway 30. The nozzle 34 directs the flow of pressurized air through the space between the extended member 24 and the retainer member 26. The dispersed air from the nozzle 34 forces the crop into the header and the shattered beans into the header during operation.

As shown in FIGS. 1 through 3 of the drawings, a bolt 40 and a nut 42 is utilized within each aperture of each base 22 for securing the guard 20 to the header. Each bolt 40 has a first aperture 44 extending through it that is aligned within the passageway 30 to prevent obstruction of the passageway 30 as best shown in FIG. 3 of the drawings. A marking may be utilized upon the bolt 40 for signaling the alignment of the first aperture 44.

Figure 4:
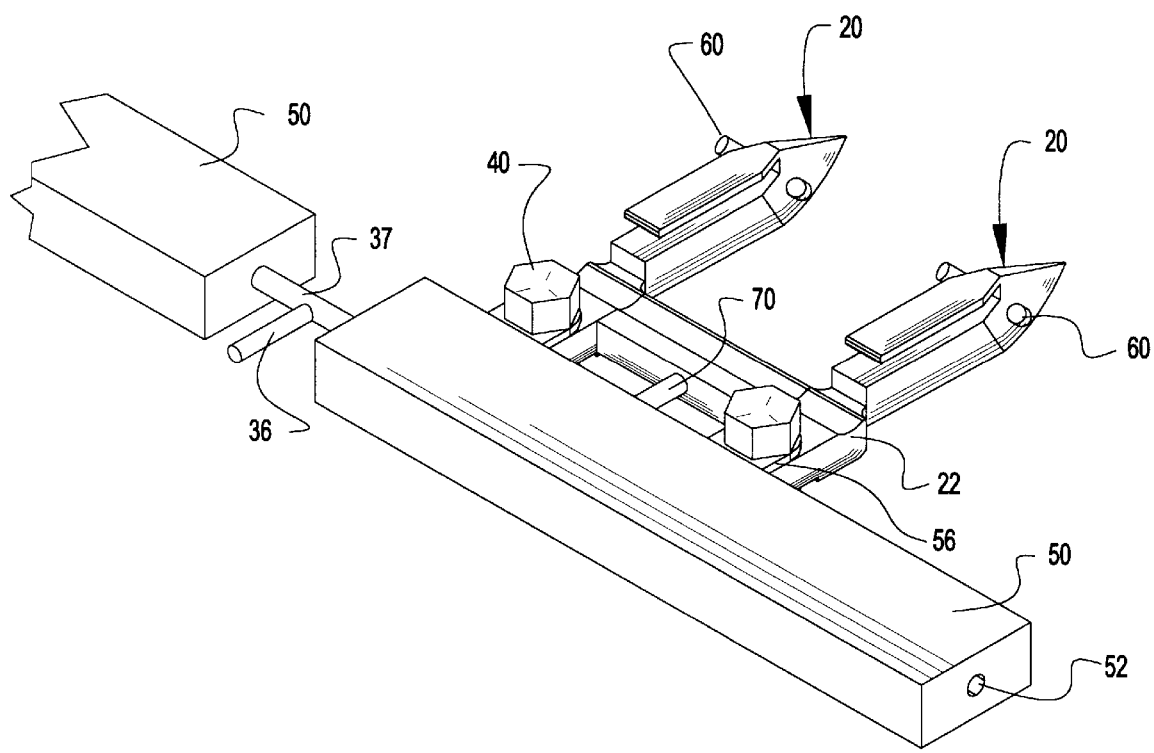
FIG. 4 is an upper perspective view of an alternative embodiment.
Figure 5:
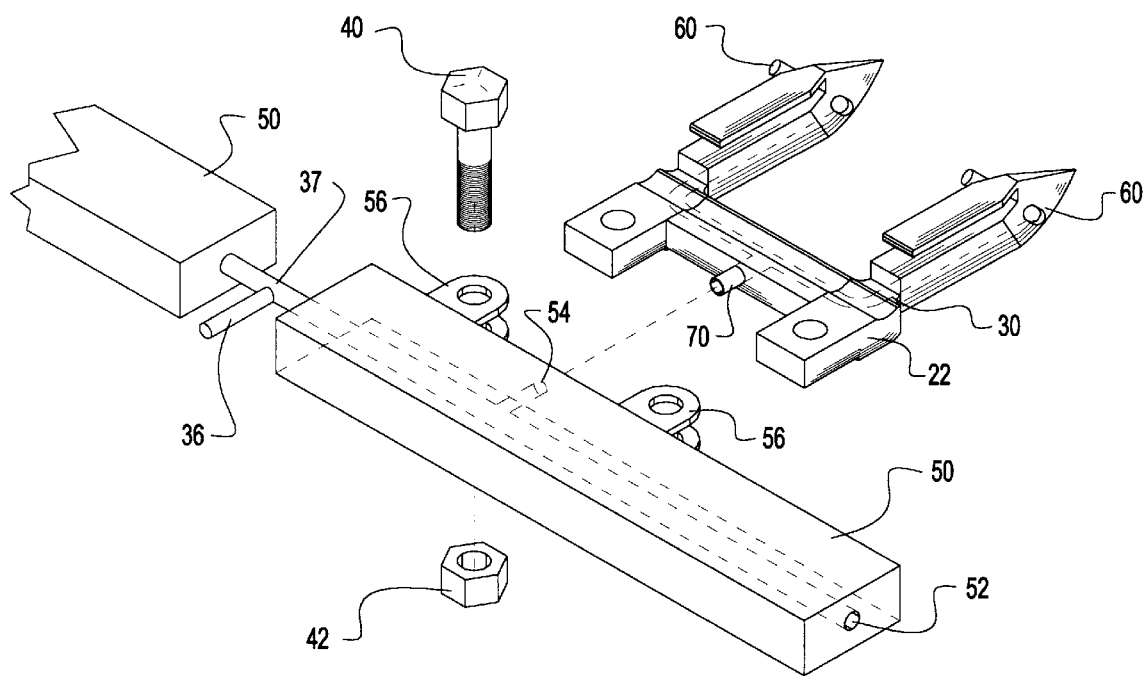
FIG. 5 is an exploded upper perspective view of the alternative embodiment.

An alternative embodiment is shown in FIGS. 4 and 5 of the drawings. In the alternative embodiment, a nipple 70 is attached to the cross member 28 of the guard 20 and is fluidly connected to the passageway 30 that extends through both of the extended members 24 as best shown in FIG. 5 of the drawings. A pair of nozzles 60 are connected to the extended members 24 and fluidly to the passageway 30. The pair of nozzles 60 form a V-shape directed toward the header for forcing the crop and pods into the header during harvesting. As further shown in FIGS. 4 and 5 of the drawings, a manifold 50 is provided that has a pair of side apertures 52. An auxiliary aperture 54 is positioned within the manifold 50 for receiving the nipple 70. The manifold 50 has a pair of brackets 56 for receiving the bases 22 of the guard 20. A T-member is fluidly connected to the side apertures 52 of adjacent manifolds 50. A hose 38 is connected to the T-member that is fluidly connected to an air pressure source.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sickel guard air system, comprising:

an air pressure means;

a guard having a pair of bases, a pair of extended members, a pair of retainer members, and a cross member;

a pair of passageways extending through said pair of bases and said pair of extended member;

a pair of nozzles within said pair of extended members and fluidly connected to said pair of passageways; and a pair of openings within said pair of bases that are fluidly connected to said pair of passageways and that are fluidly connected to said air pressure means.

2. The sickel guard air system of claim 1, wherein:

each of said pair of bases include an aperture;

a bolt insertable through said aperture, wherein said bolt includes a first aperture that is aligned within said passageway.

3. The sickel guard air system of claim 2, wherein said bolt includes a marking for indicating the position of the aperture.

4. The sickel guard air system of claim 3, wherein said pair of nozzles direct pressurized air toward a header.

5. A sickel guard air system, comprising:

an air pressure means;

a guard having a pair of bases, a pair of extended members, a pair of retainer members, and a cross member;

a pair of passageways extending through said pair of extended members;

a pair of nozzles within each of said pair of extended members and fluidly connected to said pair of passageways; and a nipple attached to said cross member and fluidly connected to said pair of passageways.

6. The sickel guard air system of claim 5, wherein each of said pair of nozzles direct pressurized air toward a header.

7. The sickel guard air system of claim 6, wherein each of said pair of nozzles are positioned in a V-shape.

* * * * *